Patented Dec. 3, 1940

2,223,377

UNITED STATES PATENT OFFICE 2,223,377

PREGNANOL-3-ONE-20 COMPOUNDS AND PROCESS FOR PREPARING THEM

Russell Earl Marker, State College, Pa., assignor to Parke, Davis & Company, Detroit, Mich., a corporation of Michigan No Drawing. Application August 6, 1937, Serial No. 157,774

12 Claims. (Cl. 260—397)

The present invention is concerned with the conversion of pregnandiol-3,20 and allo-pregnandiol-3,20 compounds, into their corresponding pregnanol-3-one-20 compounds.

It is an object of the invention to provide a method whereby pregnanol-3-one-20 compounds may be prepared from pregnandiol-3,20 compounds by easy and convenient methods capable of giving good yields.

I have found that pregnandiol-3,20 compounds or allo-pregnandiol-3,20 compounds can have the 3-hydroxyl groups protected from oxidation by partial esterification, the 20-hydroxyl groups of the resulting mono-esters oxidized to ketone groups with production of 3-esters of pregnanol-3-one-20 or allo-pregnanol-3-one-20 compounds which can then be saponified to produce pregnanol-3-one-20 compounds or allo-pregnanol-3-one-20 compounds, as the case may be.

The 3-hydroxyl group of the diol-3,20 compounds used as starting materials may be protected from oxidation by production of monoesters with mono- or di-carboxylic acids such as acetic, propionic, benzoic, salicylic or succinic acids, etc., or hydrogen halide acids, such as hydrochloric or hydrobromic acid.

By way of illustrating the invention, the following examples are given:

EXAMPLE 1.—*Epi-allo-pregnanol-3-one-20 from 3-epi-allo-pregnandiol-20*

Ten grams of 3-epi-allo-pregnandiol-20 dissolved in 100 cc. of acetic acid and 4 cc. of acetic anhydride, is refluxed for 3 hours. The solution is then cooled and 2 grams of chromic oxide in 10 cc. of 90% acetic acid is added. The reaction mixture is allowed to stand overnight, after which the solvent is evaporated off under reduced pressure. The residue is extracted with ether, the ether solution washed with aqueous sodium carbonate solution and after the ether layer is separated the ether is evaporated therefrom. The residue from evaporating off the ether is dissolved in 50 cc. of alcohol and 5 grams of betaine hydrazine chloride is added. This solution is refluxed for 30 minutes and then poured onto ice and the solution extracted with ether. The aqueous layer from the ether extraction is acidified with hydrochloric acid, warmed on a steam bath, and then extracted with ether. The ether is evaporated off and the residue refluxed for 15 minutes with a slight excess of alcoholic potassium hydroxide solution. Water is added and the solid material is filtered off. The solid product is then dried and warmed on a steam bath with 5 cc. of pyridine and 3 grams of succinic anhydride. Ether is added and the pyridine is removed by washing with hydrochloric acid. The ethereal solution is then washed with aqueous sodium carbonate solution. To this aqueous solution there is added 5 grams of sodium hydroxide and the solution is heated for 15 minutes. The product is extracted with ether, the ether evaporated off and the residue taken up and crystallized from 60% alcohol. The product has a melting-point of 170° C. When mixed with natural epi-allo-pregnanol-3-one-20 from human pregnancy urine with melting-point of 170° C., there is no depression in the melting-point.

Anal. calc. for $C_{21}H_{34}O_2$: C, 79.2; H, 10.8. Found: C, 79.4; H, 10.9.

EXAMPLE 2.—*Semicarbazone of epi-allo-pregnanol-3-one-20*

The product of Example 1, melting at 170° C., is converted into its semicarbazone with semicarbazide by the usual method for the production of semicarbazones. The semicarbazone for epi-allo-pregnanol-3-one-20 melts at 248° C. Mixed with the semicarbazone of natural epi-allo-pregnanol-3-one-20, it gives no depression in melting-point.

Anal. calcd. for $C_{22}H_{37}N_3O_2$: C, 70.3; H, 9.9. Found: C, 69.7; H, 10.1.

EXAMPLE 3.—*Epi-pregnanol-3-one-20 from 3-epi-pregnandiol-20*

Five grams of 3-epi-pregnandiol-20 melting at 242° C. and obtained from human pregnancy urine, is dissolved in 50 cc. of acetic acid containing 4 cc. of acetic anhydride and the mixture refluxed for 3 hours. The solution is then cooled to room temperature and 1 gram of chromic oxide in 10 cc. of 90% acetic acid is added. The solution is allowed to stand overnight, water is added and the solution extracted with ether. The ether extract is washed free of acetic acid and the ether is then evaporated off. The residue is dissolved in 100 cc. of ethyl alcohol. Five grams of betaine hydrazine chloride is added, the solution warmed for 15 minutes, cooled and diluted with water. After extraction with ether the aqueous layer is acidified, heated on the steam bath and the ketones extracted with ether. The residue remaining after the evaporation of the ether is warmed for 30 minutes with 10 cc. of pyridine and 5 grams of succinic anhydride. This reaction product is then diluted with ether and the ether solution freed of pyridine by shaking with dilute hydrochloric acid. The ether solution is then shaken with sodium carbonate solution and the alkaline aqueous layer separated and heated on a steam bath with potassium hydroxide solution. The epi-pregnanol-3-one-20 is extracted from the aqueous hydrolysis product with ether and after evaporating off the ether from the extract, the residue can be taken up and crystallized from alcohol-water mixture to a constant melting-point of 149° C. When this epi-pregnanol-3-one-20 melting at 149° C. is mixed with natural epi-pregnanol-3-one-20 melting at 149° C., there is no depression in the melting-point. The compound of this example also failed to give an insoluble digitonide with digitonin. The above product, epi-pregnanol-3-one-20 reacts with acetic anhydride to yield an acetate which, after crystallization from alcohol-water mixture, melts at 112° C. It also yields a semicarbazone which, after crystallization from alcohol, melts at 245° C.

EXAMPLE 4.—*Preparation of pregnanol-3-one-20 from pregnanediol-3(B),20(B)*

(a) *Production of the intermediate, pregnanediol-3(B),20(B).*

Four grams of pregnandione melting at 120° C. is dissolved in 100 cc. of acetic acid and 2 grams of platinum oxide added. The mixture is shaken with hydrogen under a pressure of 45 pounds for 3 hours. The platinum is filtered off and the acetic acid is evaporated from the filtrate under reduced pressure. The residue is crystallized from ethyl acetate-petrolum ether mixture at a constant melting-point of 174° C.

Anal. calcd. for $C_{21}H_{36}O_2$: C, 78.3; H, 11.3. Found: C, 78.3; H, 11.4.

This pregnanediol - 3(B),20(B) compound is converted into its diacetate by refluxing with an excess of acetic anhydride. The diacetate is crystallized from alcohol and has a melting-point of 111° C.

Anal. calcd. for $C_{25}H_{40}O_4$: C, 74.4; H,10.0. Found: C, 74.5; H, 10.4.

(b) *Preparation of pregnanol-3-one-20 from pregnanediol-3(B),20(B).*

This example is carried out by the general procedure given above for preparation of the pregnanol-3-one-20 compounds of Examples 1 and 3, yielding an olone also melting at approximately 149° C. but differing from the product of Example 3 as shown by lowering of mixed melting-point and the fact that it gives an insoluble digitonide.

The pregnanol-3-one-20 of Example 4 reacts with acetic anhydride to yield an acetate which, when crystallized from alcohol-water mixture, melts at 121° C. This acetate, when mixed with the acetate of epi-pregnanol-3-one-20 (Example 3), gives a 20° drop in melting-point. Pregnanol-3-one-20 also gives a semicarbazone with a melting-point of 245° C.

The examples are given merely in order to illustrate the invention. The invention itself is not limited to the specific substances, conditions and various details described in the examples but is defined by the appended claims.

What I claim as my invention is:

1. Method for the preparation of an ol-3-one-20 compound of the pregnane and allo-pregnane series comprising protecting the 3-hydroxyl group of a diol-3,20 compound of the pregnane and allo-pregnane series by esterification, oxidizing the hydroxyl in the 20-position to a ketone group, with production of an ester of the corresponding ol-3-one-20 compound, and hydrolyzing the latter to produce the ol-3-one-20 compound.

2. Method for the preparation of an ol-3-one-20 compound of the pregnane and allo-pregnane series comprising protecting the 3-hydroxyl group of a diol-3,20 compound of the pregnane and allo-pregnane series by acylation, oxidizing the hydroxyl in the 20-position to a ketone group, with production of an ester of the corresponding ol-3-one-20 compound, and hydrolyzing the latter to produce the ol-3-one-20 compound.

3. Method for the preparation of an ol-3-one-20 compound of the pregnane and allo-pregnane series comprising protecting the 3-hydroxyl group of a diol-3,20 compound of the pregnane and allo-pregnane series by acetylation, oxidizing the hydroxyl in the 20-position to a ketone group, with production of an acetate of the corresponding ol-3-one-20 compound, and hydrolyzing the latter to produce the ol-3-one-20 compound.

4. Method for the preparation of epi-allo-pregnanol-3-one-20 from 3-epi-allo-pregnandiol-20 which comprises protecting the 3-hydroxyl group of the diol by esterification, oxidizing the 20-hydroxyl of the ester to a ketone group with production of an ester of epi-allo-pregnanol-3-one-20, and hydrolyzing the latter to produce epi-allo-pregnanol-3-one-20.

5. Method for the preparation of epi-allo-pregnanol-3-one-20 from 3-epi-allo-pregnandiol-20 which comprises protecting the 3-hydroxyl group of the diol by acetylation, oxidizing the 20-hydroxyl of the acetate to a ketone group with production of an acetate of epi-allo-pregnanol-3-one-20, and hydrolyzing the latter to produce epi-allo-pregnanol-3-one-20.

6. Method for the preparation of epi-pregnanol - 3 - one - 20 from 3-epi-pregnandiol-20 which comprises protecting the 3-hydroxyl group of the diol by esterification, oxidizing the 20-hydroxyl of the ester to a ketone group with production of an ester of epi-pregnanol-3-one-20, and hydrolyzing the latter to produce epi-pregnanol-3-one-20.

7. Method for the preparation of pregnanol-3-one-20 from pregnanediol-3(B),20(B) which comprises protecting the 3-hydroxyl group of the diol by esterification, oxidizing the 20-hydroxyl of the ester to a ketone group with production of an ester of pregnanol-3-one-20, and hydrolyzing the latter to produce pregnanol-3-one-20.

8. A compound of the group comprising pregnanol-3-one-20 which has a melting point of approximately 149° C. and which forms an insoluble digitonide with digitonin, and esters of said pregnanol-3-one-20.

9. Pregnanol-3-one-20 which has a melting point of approximately 149° C. and which forms an insoluble digitonide with digitonin.

10. Acetate of pregnanol-3-one-20 which has a melting point of approximately 121° C. and which forms an insoluble digitonide with digitonin.

11. The method which comprises treating pregnanediol-3(B),20(B), precipitable with digitonin with an esterifying agent to produce partial esterification at the 3-hydroxyl group of the diol and oxidizing the free 20-hydroxyl of the ester to a ketone group with production of an ester of pregnanol-3-one-20.

12. Method for the preparation of pregnanol-3-one-20 precipitable with digitonin from pregnanediol-3(B),20(B) which comprises protecting the 3-hydroxyl group of the diol by partial acetylation, oxidizing the free 20-hydroxyl of the monoacetate to a ketone group with the production of an acetate of pregnanol-3-one-20, and hydrolyzing the latter to produce the pregnanol-3-one-20 precipitable with digitonin.

RUSSELL EARL MARKER.